(12) United States Patent
Suzuki et al.

(10) Patent No.: US 7,486,175 B2
(45) Date of Patent: Feb. 3, 2009

(54) VEHICLE DRIVE ASSIST SYSTEM

(75) Inventors: Isamu Suzuki, Kariya (JP); Ichiro Yoshida, Takahama (JP); Yusuke Matsui, Nukata-gun (JP); Tateshi Kato, Anjo (JP)

(73) Assignee: DENSO CORPORATION, Kariya (JP)

( * ) Notice: Subject to any disclaimer, the term of this patent is extended or adjusted under 35 U.S.C. 154(b) by 297 days.

(21) Appl. No.: 11/451,377

(22) Filed: Jun. 13, 2006

(65) Prior Publication Data

US 2007/0013495 A1 Jan. 18, 2007

(30) Foreign Application Priority Data

Jun. 15, 2005 (JP) .............................. 2005-175009

(51) Int. Cl.
*B60Q 1/00* (2006.01)
(52) U.S. Cl. ...................... 340/435; 348/148; 358/520; 382/104
(58) Field of Classification Search ................ 340/435, 340/932.2; 348/148; 382/104; 358/520
See application file for complete search history.

(56) References Cited

U.S. PATENT DOCUMENTS

| | | | |
|---|---|---|---|
| 5,576,724 A * | 11/1996 | Fukatsu et al. ................. 345/7 |
| 6,580,984 B2 * | 6/2003 | Fecher et al. ................. 701/36 |
| 6,593,960 B1 | 7/2003 | Sugimoto et al. |
| 6,879,706 B2 * | 4/2005 | Satoh et al. ................. 382/104 |
| 7,065,257 B2 * | 6/2006 | Soga et al. ................. 382/274 |
| 7,135,961 B1 | 11/2006 | Operowsky et al. |
| 7,199,767 B2 * | 4/2007 | Spero ............................. 345/7 |
| 2003/0047683 A1 * | 3/2003 | Kaushal ....................... 250/330 |
| 2003/0141990 A1 | 7/2003 | Coon |
| 2004/0066376 A1 * | 4/2004 | Donath et al. ............... 345/169 |
| 2004/0145459 A1 | 7/2004 | Himmelstein |
| 2004/0158366 A1 | 8/2004 | Dieterle |
| 2004/0161159 A1 * | 8/2004 | Holz et al. .................. 382/254 |
| 2004/0267455 A1 | 12/2004 | Hatano et al. |
| 2005/0099116 A1 * | 5/2005 | Koide .......................... 313/504 |
| 2005/0131597 A1 | 6/2005 | Raz et al. |
| 2005/0154505 A1 * | 7/2005 | Nakamura et al. ............. 701/1 |

(Continued)

FOREIGN PATENT DOCUMENTS

EP 570037 A1 * 11/1993

(Continued)

OTHER PUBLICATIONS

Office Action mailed May 21, 2008 in related U.S. related U.S. Appl. No. 11/498,231.

(Continued)

*Primary Examiner*—George A Bugg
*Assistant Examiner*—Samuel J Walk
(74) *Attorney, Agent, or Firm*—Posz Law Group, PLC

(57) ABSTRACT

A display unit displays supplied image information on or through a front glass of a vehicle. A system controller generates and supplies the image information to the display unit. The image information indicates lane guides of the traveling lane, which correspond to a configuration of a traveling lane that is viewed from a view point position of a driver through the front glass. The system controller sets a display color of the lane guides displayed by the display unit to a color, which is distinguishable from a color of a road surface.

8 Claims, 3 Drawing Sheets

U.S. PATENT DOCUMENTS

| | | |
|---|---|---|
| 2005/0200700 A1* | 9/2005 | Schofield et al. .......... 340/435 |
| 2005/0278118 A1 | 12/2005 | Kim |
| 2006/0208927 A1 | 9/2006 | Poor et al. |
| 2006/0212196 A1 | 9/2006 | Davidson et al. |
| 2007/0040705 A1 | 2/2007 | Yoshioka et al. |

FOREIGN PATENT DOCUMENTS

| | | |
|---|---|---|
| JP | A-06-247184 | 9/1994 |
| JP | A-07-057200 | 3/1995 |
| JP | A-10-138792 | 5/1998 |
| JP | A-10-311732 | 11/1998 |
| JP | A-2000-172994 | 6/2000 |
| JP | A-2000-194995 | 7/2000 |
| JP | A-2000-211452 | 8/2000 |
| JP | A-2002-019491 | 1/2002 |
| JP | A-2003-123185 | 4/2003 |
| JP | A-2004-220281 | 8/2004 |
| JP | A-2005-078414 | 3/2005 |
| JP | A-2005-138801 | 6/2005 |
| JP | A-2005-170323 | 6/2005 |

OTHER PUBLICATIONS

Office Action mailed Nov. 12, 2008 in related U.S. Appl. No. 11/498,231.

* cited by examiner

VEHICLE DRIVE ASSIST SYSTEM

CROSS REFERENCE TO RELATED APPLICATIONS

This application is based on and incorporates herein by reference Japanese Patent Application No. 2005-175009 filed on Jun. 15, 2005. This is application is also related to U.S. patent application Ser. No. 11/498,231 filed on Aug. 3, 2006 and entitled "Unsafe Location Warning System."

BACKGROUND OF THE INVENTION

1. Field of the Invention

The present invention relates to a vehicle drive assist system.

2. Description of Related Art

Lately, a vehicle drive assist system, which uses a head-up display, has been proposed (see Japanese Unexamined Patent Publication No. 2005-78414). The head-up display projects drive assist information over a vehicle front glass (a windshield) as image information in such a manner that the image information is displayed as a virtual image, which is overlapped with the vehicle front view. With such a vehicle drive assist system, an amount of movement of a sight line (also referred to as a line of sight) of the driver is advantageously reduced, and thereby driver's misinterpretation of the drive assist information can be advantageously reduced. Because of the above reason, the above drive assist system is widely accepted.

At the time of driving the vehicle under some unfavorable environmental conditions, such as driving of the vehicle during rain at night or driving of the vehicle along a snow-covered road, it is sometimes difficult or impossible for a vehicle driver to visually recognize lane markers (white lines or yellow lines), which indicate a traveling lane of the driver's own vehicle. This condition is not desirable for safety reason.

To counteract with the above situation, it is conceivable to use the above drive assist system to display lane guides, which indicate the traveling lane of the own vehicle, over the view seen through the vehicle front glass (i.e., the front view of the vehicle driver) in such a manner that the lane guides are displayed in association with the actual traveling lane. However, under the above unfavorable environmental conditions, the color of the lane guides displayed on the front glass by the head-up display could become similar to its background color and thereby difficult to be recognized by the driver.

SUMMARY OF THE INVENTION

The present invention addresses the above disadvantage. Thus, it is an objective of the present invention to provide a vehicle drive assist system that is capable of displaying at least one lane guide, which corresponds to a configuration of a traveling lane of an own vehicle, in a manner that allows better recognition of the at least one lane guide by a driver of the vehicle under some unfavorable environmental condition.

To achieve the objective of the present invention, there is provided a vehicle drive assist system, which includes a displaying means, an information obtaining means, a view point sensing means, an image information generating means, a background color sensing means, a display color adjusting means. The displaying means is for displaying supplied image information on or through a front glass of a vehicle. The information obtaining means is for obtaining lane information that indicates a configuration and a position of a traveling lane, along which the vehicle travels. The view point sensing means is for sensing a view point position of a driver of the vehicle. The image information generating means is for generating and supplying the image information to the displaying means. The image information indicates at least one lane guide of the traveling lane, which corresponds to the configuration of the traveling lane that is viewed from the sensed view point position of the driver through the front glass. The image information generating means generates the image information through computation based on the sensed view point position of the driver, which is sensed by the view point sensing means, and the lane information, which is obtained by the information obtaining means. The background color sensing means is for sensing a color of a road surface, which is located ahead of the vehicle. The display color adjusting means is for setting a display color of the at least one lane guide displayed by the displaying means to a color, which is distinguishable from the sensed color of the road surface that is sensed by the background color sensing means.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to FIGS. 1 to 3.

Figure 1:
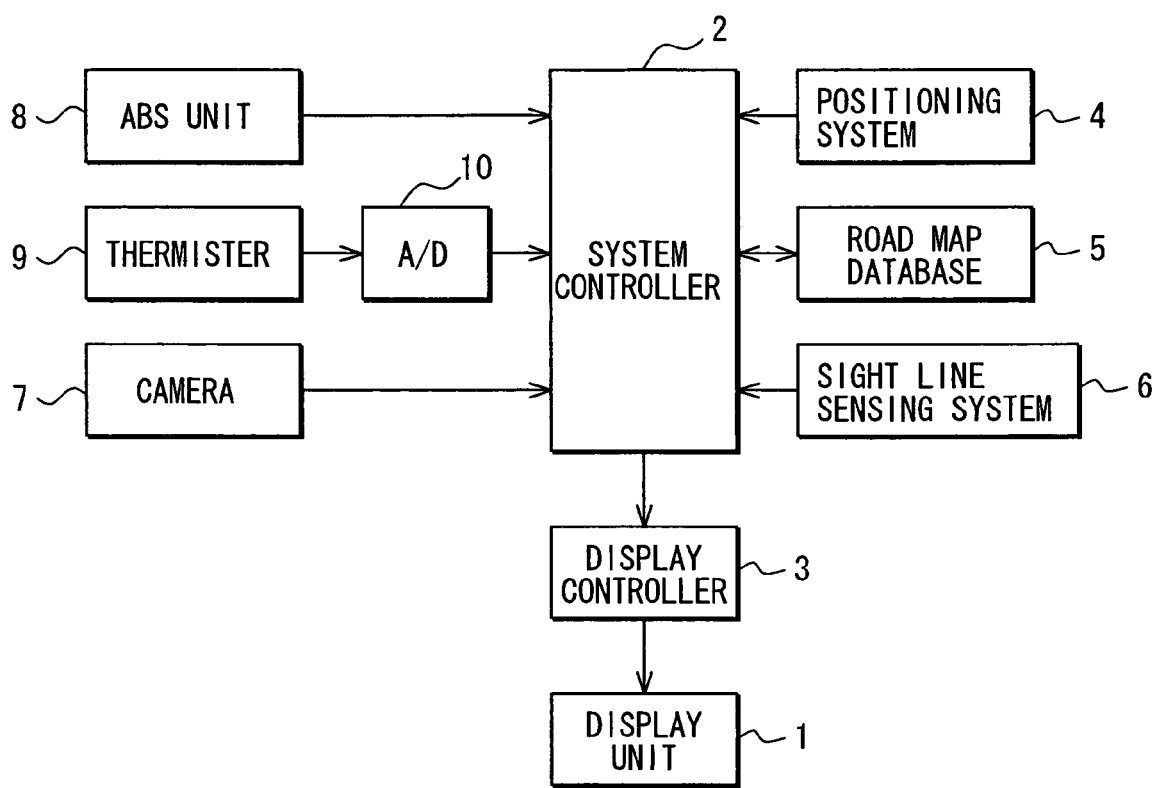
FIG. 1 is a block diagram showing an entire structure of a vehicle drive assist system according to an embodiment of the present invention.

FIG. 1 is a block diagram showing an entire structure of a vehicle drive assist system of the present embodiment.

With reference to FIG. 1, a display unit (serving as a displaying means) 1 is a head-up display of a known type, which includes a display module and a reflecting mirror. The display module generates an image and may be a combinational module, which includes a combination of a color liquid crystal display (LCD) panel and a light source unit. The display unit 1 may be placed at, for example, a dashboard of the vehicle in front of a driver's seat. The display unit 1 projects an image, which corresponds to supplied image information, on a vehicle front glass (windshield) located in front of the driver's seat, so that the image is displayed through the front glass as a virtual image.

Here, it should be understood that in place of the head-up display that displays the virtual image, an electroluminescence (EL) element of a transmission type or any other display element of a transmission type, which is bonded to or joined to the front glass, may be used as the displaying means.

A system controller 2 (corresponding to an information obtaining means, an image information generating means, a background color sensing means, a display color adjusting means) includes a microcomputer and controls a displayed image on the display unit 1 through a display controller 3.

A positioning system 4 (corresponding to a position sensing means) includes, for example, a known global positioning system (GPS) receiver used in a typical car navigation system and provides current vehicle position information (longitude and latitude information), which indicates a current position of the own vehicle, to the system controller 2.

A road map database 5, which is accessible from the system controller 2, stores road map data and road configuration data. The road map data is used for a vehicle navigation purpose. The road configuration data indicates road configurations (road shapes), particularly a configuration (a shape) and a position of each of two opposed side edges of a traveling lane of the own vehicle. The road configuration data includes a collection of coordinates (a collection of points) that is used to express, for example, a cubic Bezier curve (or a quadratic spline curve). The system controller 2 produces the configuration of each of the opposed side edges of the traveling lane through computation based on the corresponding collection of coordinates.

A sight line sensing system (corresponding to a view point sensing means) 6 senses a view point position (i.e., a position of a view point) of the vehicle driver. For instance, the sight line sensing system 6 may include a lighting means, an image capturing means, an image processing means and a computing means (not shown). The lighting means projects an infrared light over a face of the vehicle driver. The image capturing means converts the reflected infrared light, which is reflected from the face of the vehicle driver, into a video signal. The image processing means extracts an image of the face of the vehicle driver through, for example, binarization or feature point extraction, which is performed based on the video signal. The computing means senses, i.e., determines a sight line direction (a direction of the sight line) and the view point position of the vehicle driver based on the extracted image. The sight line sensing system 6 outputs the sensed results to the system controller 2.

A camera (corresponding to an image capturing means) 7 captures an image of a road surface, which is located ahead of the vehicle, and has a structure that is capable of capturing of a low light level image, such as a night image (e.g., a structure that uses a highly sensitive camera). The camera 7 outputs the captured image data to the system controller 2.

An anti-lock braking system (ABS) unit 8 performs an anti-lock braking control operation of the vehicle and outputs a signal, which indicates a slip ratio of each corresponding vehicle wheel, to the system controller 2. A thermistor 9 senses a temperature outside of the vehicle and outputs a measurement signal, which indicates the sensed temperature, to the system controller 2 through an analog-to-digital (A/D) converter 10. The ABS unit 8 and the thermistor 9 constitute a snow sensing means. In a state where the sensed temperature, which is sensed by the thermistor 9, is equal to or less than a predetermined temperature, and the slip rate, which is indicated by the signal outputted from the ABS unit 8, is equal to or greater than a predetermined value, the system controller 2 determines that snow is present on the road surface, along which the own vehicle travels. Alternative to or in addition to the ABS unit 8 and the thermistor 9, the camera 7 may be used as the snow sensing means. More specifically, the captured image, which is captured by the camera 7, may be used to sense the presence of the snow on the road surface. Furthermore, a switch, which is operated by the vehicle driver or any other vehicle occupant at the time of visually recognizing the presence of the snow on the road surface, may be provided as the snow sensing means.

Figure 2:
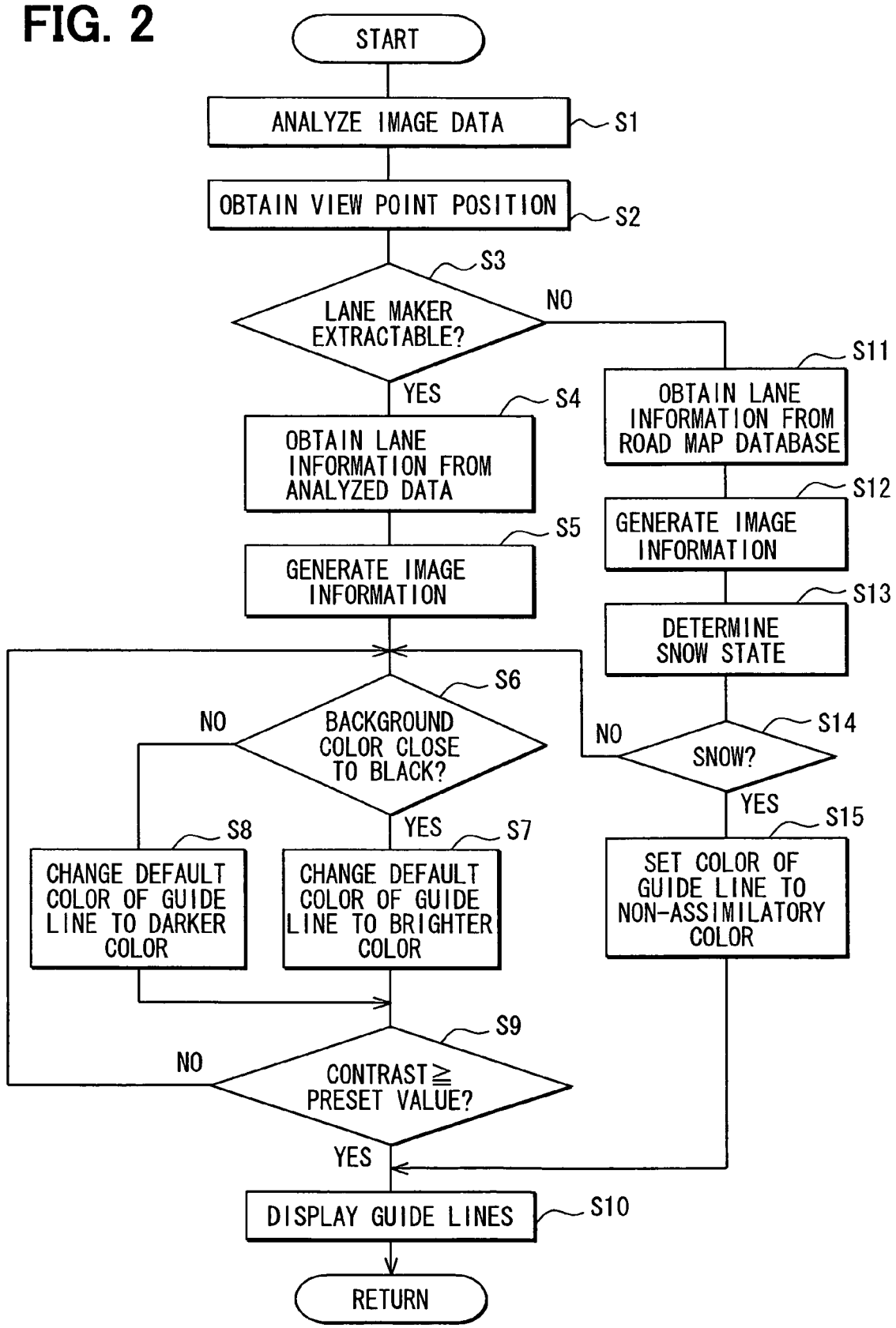
FIG. 2 is a flowchart indicating a control operation executed in a system controller according to the embodiment.

FIG. 2 shows an exemplary control operation executed in the system controller 2, which will be described below.

Specifically, in a flowchart of FIG. 2, the image data supplied from the camera 7 is analyzed at step S1. Then, at step S2, a view point position of the vehicle driver, which is sensed by the sight line sensing system 6, is obtained, i.e., is determined. Next, at step S3, it is determined whether an image of each corresponding lane marker (a white line or a yellow line), which is located ahead of the vehicle, is extractable based on the analyzed result of the above image data (hereinafter, referred to as analyzed data).

When it is determined that the image of each corresponding lane marker is extractable at step S3 (i.e., YES at step S3), control proceeds to step S4. At step S4, the image of each corresponding lane marker, which is extracted from the analyzed data, is obtained as lane information, which indicates the configuration and the position of the traveling lane of the own vehicle. Then, control proceeds to step S5 where image information is generated through computation based on the view point position and the lane information. This image information indicates two guide lines (lane guides), which respectively correspond to the configurations of the opposed side edges of the traveling lane viewed from the view point position of the vehicle driver through the front glass. A default color of the guide line should match with an actual color of the actual lane marker. However, in the following description, this color is made as an achromatic color for the sake of simplifying the description. Furthermore, this image information also includes each corresponding cross-point position where a straight line (the sight line direction), which connects between the view point position of the vehicle driver and a corresponding point of the corresponding lane marker on the road, crosses the front glass. This information is used to determine an image projecting position of the display unit 1.

Thereafter, control proceeds to step S6 where it is determined whether a background color (i.e., a color of the road), which corresponds to a displaying position of the corresponding guide line, is a color that is close to black (or a color that verges on black) based on the analyzed data. When YES is returned at step S6, control proceeds to step S7 where the default color of the guide line is changed to a brighter color that is closer to white by a predetermined ratio. In contrast, when NO is returned at step S6, control proceeds to step S8 where the default color of the guide line is changed to a darker color that is closer to black by a predetermined ratio. After execution of step S7 or S8, control proceeds to step S9. At step S9, it is determined whether a contrast between the default color of the guide line and the background color (a difference between a brightness of the default color of the guide line and a brightness of the background color) is equal to or greater than a preset value. When it is determined that the contrast between the default color of the guide line and the background color is less than the preset value (i.e., NO at step S9), control returns to step S6. In contrast, when it is determined that the contrast between the default color of the guide line and the background color is equal to or greater than the preset value (i.e., YES at step S9), control proceeds to step S10. At step S10, the image information, which indicates each corresponding guide line of the default color, is supplied to the display unit 1 through the display controller 3, so that the two guide lines, which correspond to the image information, are displayed as the virtual images through the front glass. Then, control returns to step S1.

Figure 3:
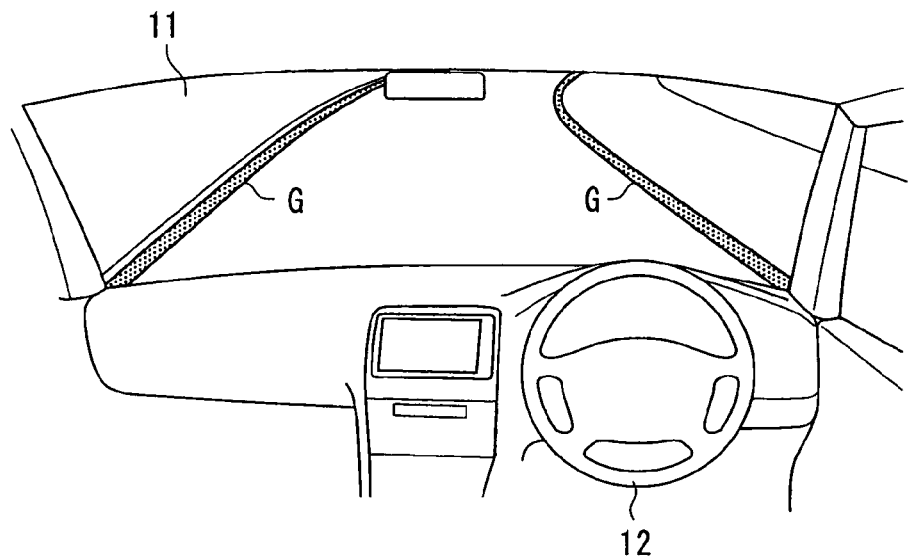
FIG. 3 is a diagram showing, in a simplified manner, a view around a vehicle driver's seat according to the embodiment.

Specifically, such display is executed in a manner shown in, for example, FIG. 3, which shows, in a simplified manner, a view around the vehicle driver's seat taken from the view point of the vehicle driver. In FIG. 3, the front glass 11, a steering wheel 12 and the two guide lines G are indicated. In the case where the electroluminescence (EL) element of the transmission type or any other display element of the transmission type, which is bonded to or joined to the front glass, is used as the displaying means in place of the display unit 1, each guide line may be displayed along each corresponding cross-point position where the corresponding straight line (the sight line direction), which connects between the view point position of the vehicle driver and the corresponding point of the corresponding lane marker on the road, crosses the front glass. In this way, the display mode, which is equivalent to the display mode shown in FIG. 3, can be implemented.

When NO is returned at step S3, i.e., when it is determined that the image of each corresponding lane marker, which is located ahead of the vehicle, is not extractable based on the analyzed data, control proceeds to step S11. At step S11, the position of the own vehicle is recognized, i.e., is determined based on the current vehicle position information supplied from the positioning system 4, and then the road configuration data, which indicates the configuration and the position of each of the opposed side edges of the traveling lane of the own vehicle, is obtained as the lane information by accessing the road map database 5 based on the recognized position of the own vehicle. Next, control proceeds to step S12. At step S12, the image information, which indicates the two guide lines that correspond to the configurations of the opposed side edges of the traveling lane viewed from the view point position of the vehicle driver through the front glass, is generated through computation based on the view point position obtained at step S2 and the lane information.

After the generation of the image information, control proceeds to step S13. At step S13, a snow state determination process is executed based on the sensed temperature supplied from the thermistor 9 and the signal supplied from the ABS unit 8. Specifically, it is determined that the snow is present on the road surface, along which the own vehicle travels, when the following two conditions are satisfied: the sensed temperature, which is sensed with the thermistor 9, is equal to or less than the predetermined temperature, and the slip ratio, which is indicated by the signal from the ABS unit 8, is equal to or greater than the predetermined value. Then, control proceeds to step S14 where it is determined whether the result of the determination made at step S13 is affirmative, i.e., whether the snow is present on the road surface. When it is determined that the snow is present on the road surface at step S14 (i.e., YES at step S14), control proceeds to step S15. At step S15, the color of the guide line is changed to the default color, specifically to a non-assimilatory color (e.g., blue), which is not assimilated to the color of a surface of the snow on the road surface, i.e., which is substantially different from the color of the surface of the snow on the road surface. Then, control proceeds to step S10. In contrast, when it is determined that snow is not present on the road surface at step 514 (i.e., NO at step S14), control proceeds to step S6 described above.

In summary, in the case where the image of each corresponding lane marker locate ahead of the vehicle is extractable based on the analyzed data, which is produced after analyzing the image data captured by the camera 7, the system controller 2 obtains the extracted images of the lane markers as the lane information that indicates the configuration and the position of the traveling lane, along which the own vehicle travels. Then, based on this lane information and the view point position of the vehicle driver, which is sensed by the sight line sensing system 6, the system controller 2 generates the image information that indicates the two guide lines, which correspond to the configurations of the opposed side edges of the traveling lane of the own vehicle viewed from the view point position of the vehicle driver through the front glass. Thereafter, the system controller 2 outputs this image information to the display unit 1. In the case where the image of the lane marker located ahead of the vehicle cannot be extracted based on the analyzed data, which is produced after analyzing the image data captured by the camera 7, the system controller 2 obtains the road configuration data, which indicates the configurations and the positions of the opposed side edges of the traveling lane, as the lane information by accessing the road map database 5 based on the recognized position of the own vehicle, which is recognized based on the current vehicle position information supplied from the positioning system 4. Then, based on this lane information and the view point position of the vehicle driver, which is sensed by the sight line sensing system 6, the system controller 2 generates the image information that indicates the two guide lines, which respectively correspond to the configurations of the opposed side edges of the traveling lane viewed from the view point position of the vehicle driver through the front glass. Thereafter, the system controller 2 outputs this image information to the display unit 1.

The display unit 1 displays the supplied image information through the front glass of the vehicle, so that the two guide lines (see the lines indicated by G in FIG. 3), which indicate the configurations of the side edges of the traveling lane of the own vehicle, are displayed at the front view of the vehicle driver to correspond with the actual traveling lane, which is located ahead of the vehicle driver. In this way, the vehicle driver can recognize the two displayed guide lines like the side edges of the actual traveling lane.

Here, in the case where the snow is not present on the road surface, the background color (the color of the road), which corresponds to the displaying position of the corresponding guide line, is sensed based on the analyzed data. Then, based on the sensed result, the background color is set in such a manner that the contrast between the display color of the guide line and the background color (the difference between the brightness of the display color of the guide line and the brightness of the background color) becomes equal to or greater than the preset value. As a result, it is possible to prevent the displayed guide lines from being difficult to visually recognize due to the assimilation of the guide lines to the background (particularly, the road surface that is overlapped with the guide line) that is viewed by the vehicle driver through the front glass. Therefore, the sufficient visibility of the guide lines can be ensured without being influenced by the surrounding environment.

Furthermore, in the case where the snow is present on the road surface, the display color of the guide line is set to the non-assimilatory color, which is clearly distinguishable from the color of the surface of the snow. Thus, even at the time of traveling the snow-covered road, the vehicle driver can effectively recognize the traveling lane of the driver's own vehicle.

As discussed above, in the case where the lane information is obtained from the analyzed data, which is generated by analyzing the image data captured by the camera 7, visual identification of the traveling lane can be appropriately performed by the vehicle driver based on the guide lines displayed by the display unit 1 even in the situation where the vehicle driver has a difficulty in recognizing the lane markers, which indicate the traveling lane of the driver's own vehicle. This is made possible by the fact that the sensitivity of the camera 7 is higher than the luminosity factor of the human.

The present invention is not limited to the above embodiment. Specifically, the above embodiment can be modified as follows.

Figure 4:
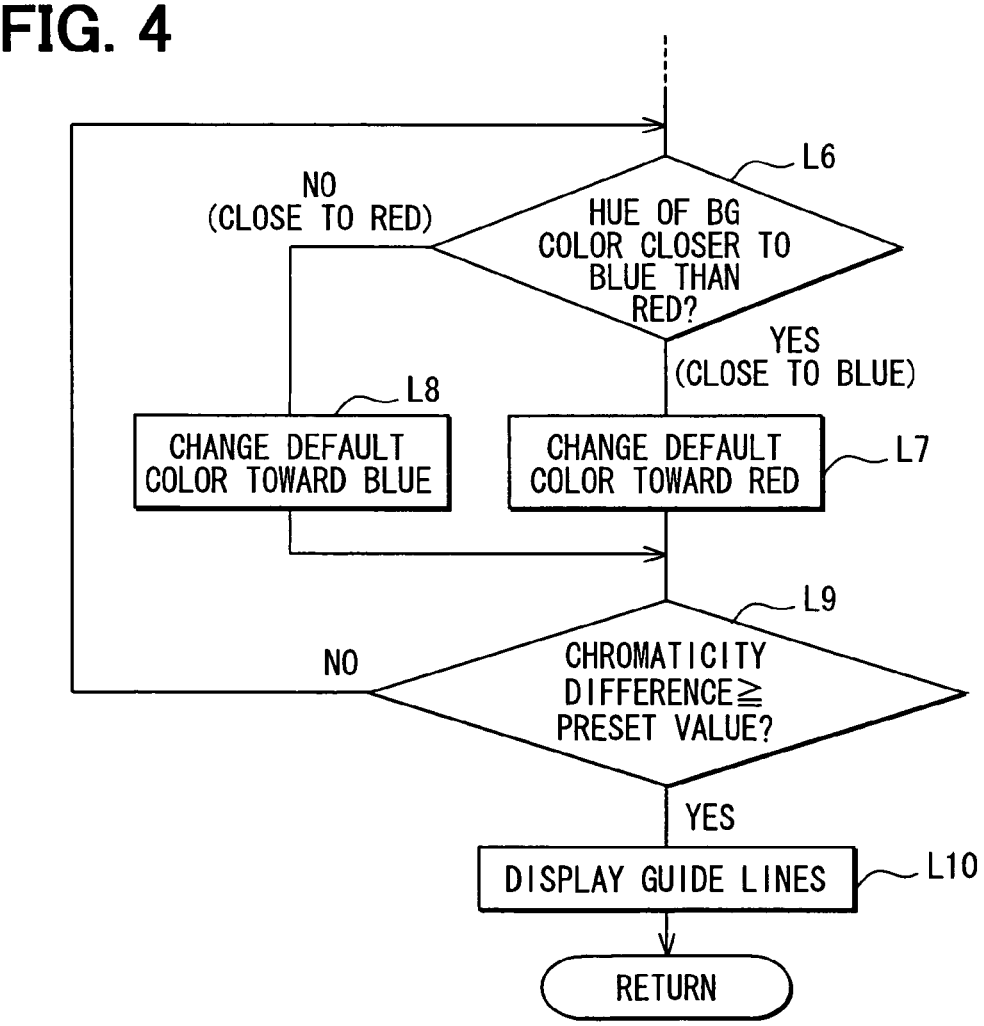
FIG. 4 is a flowchart showing a modification of the embodiment.

In the above embodiment, the guide lines are displayed with the achromatic color in the case where the snow is not present on the road surface. Alternatively, the guide lines may be displayed with a chromatic color. FIG. 4 shows an exemplary control operation executed in the system controller 2 to perform the displaying of the guide lines with the chromatic color. The exemplary control operation of FIG. 4 is characterized by steps L6 to L9, which are executed in place of steps S6 to S9 of FIG. 2. Specifically, at step L6, which is executed after execution of step S5 (FIG. 2) or after returning of NO at step S14 (FIG. 2), it is determined whether a hue of the background color (the color of the road), which corresponds to the displaying position of the guide line, is closer to blue than red based on the analyzed data, which is generated by analyzing the image captured by the camera 7. When the hue is blue or close to blue, i.e., when YES is returned at step L6, control proceeds to step L7. At step L7, the default color of the guide line is changed toward red by a predetermined ratio. In contrast, when the hue is red or close to red, i.e., when NO is returned at step L6, control proceeds to step L8. At step L8, the default color of the guide line is changed toward blue by a predetermined ratio. After execution of step L7 or L8, control proceeds to step L9. At step L9, it is determined whether a chromaticity difference between the default color of the guide line and the background color (a difference between the hues of the colors) is equal to or greater than a preset value. When NO is returned at step L9, control returns to step L6. In contrast, when YES is returned at step L9, control proceeds to step S10 described above where the image information, which indicates the guide line of the default color, is supplied to the display unit 1 through the display controller 3, so that the two guide lines, which correspond to the image information, are displayed as the virtual images through the front glass. Then, control returns to step S1.

The camera 7 may be one that can capture a low light level image. In this way, accurate lane information can be obtained at the time of driving the vehicle, for example, at night, so that the guide lines can be effectively displayed.

For instance, the lane information, which is obtained based on the image data captured by the camera 7 or is obtained from the road map database 5, may be constructed to include obstacle information. The obstacle information indicates presence of an obstacle, such as a gutter or a step, along one or both of the side edges of the traveling lane of the own vehicle. When the lane information includes the obstacle information indicating the presence of the obstacle along one or both of the side edges of the traveling lane, i.e., when the lane information indicates the presence of the obstacle along one or both of the side edges of the traveling lane, the system controller 2 may set the display color of the guide line(s), which is generated through the computation, to a predetermined warning color (e.g., red or orange). In this way, in the case where the obstacles, such as the gutters or the steps, are present along the side edges of the traveling lane of the own vehicle, the guide lines, which are displayed by the display unit 1, are indicated with the warning color. Thus, even at the time of driving the vehicle along the snow-covered road or at the time of driving the vehicle at night where the obstacles cannot be easily visually identified, it is possible to alert the vehicle driver of the obstacles. This is beneficial for the safety drive of the vehicle.

In the above embodiment, the two guide lines are used as the lane guides. Alternatively, the entire traveling lane may be indicated with a single color (including an achromatic color) to serve as a lane guide.

In the above embodiment, the function of the display color adjusting means, which sets the display color of the lane guides, is implemented in the system controller 2. Alternatively, the function of the display color adjusting means may be implemented in the display controller 3.

The structure of obtaining the lane information based on the image captured by the camera may be implemented as the need arises. Furthermore, the lane information may be always obtained from the road map database 5. Also, in the above embodiment, the road map database 5 is provided in the vehicle. Alternatively, the road map database may be provided in an external facility, which can communicate with the vehicle.

Additional advantages and modifications will readily occur to those skilled in the art. The invention in its broader terms is therefore not limited to the specific details, representative apparatus, and illustrative examples shown and described.

What is claimed is:

1. A vehicle drive assist system comprising:
a displaying means for displaying supplied image information on or through a front glass of a vehicle;
an information obtaining means for obtaining lane information that indicates a configuration and a position of a traveling lane, along which the vehicle travels;
a view point sensing means for sensing a view point position of a driver of the vehicle;
an image information generating means for generating and supplying the image information to the displaying means, wherein the image information indicates at least one lane guide of the traveling lane, which corresponds to the configuration of the traveling lane that is viewed from the sensed view point position of the driver through the front glass, and the image information generating means generates the image information though computation based on the sensed view point position of the driver, which is sensed by the view point sensing means, and the lane information, which is obtained by the information obtaining means;
a background color sensing means for sensing a color of a road surface, which is located ahead of the vehicle; and
a display color adjusting means for setting a display color of the at least one lane guide displayed by the displaying means to a color, which is distinguishable from the sensed color of the road surface that is sensed by the background color sensing means,
wherein the lane information is constructed to include obstacle information, which indicates presence of an obstacle along at least one of two opposed side edges of the traveling lane; and
when the image information, which indicates the at least one lane guide, is computed by the image information generating means based on the lane information, which includes the obstacle information indicating the presence of the obstacle, the display color adjusting means sets the display color of the at least one lane guide to a predetermined warning color.

2. The vehicle drive assist system according to claim 1, wherein the at least one lane guide includes two guide lines, each of which corresponds to a configuration of a corresponding one of the two opposed side edges of the traveling lane.

3. The vehicle drive assist system according to claim 1, wherein the display color adjusting means sets a brightness of the display color of the at least one lane guide in such a manner that a difference between the brightness of the display color of the at least one lane guide and a brightness of the sensed color of the road surface sensed by the background color sensing means becomes equal to or greater than a preset value.

4. The vehicle drive assist system according to claim 1, wherein the display color adjusting means sets a hue of the display color of the at least one lane guide in such a manner that a difference between the hue of the display color of the at least one lane guide and a hue of the sensed color of the road surface sensed by the background color sensing means becomes equal to or greater than a preset value.

5. The vehicle drive assist system according to claim 1, further comprising:
   a position sensing means for sensing a position of the vehicle; and
   a road map database that stores the lane information, which indicates the configuration and the position of the traveling lane, wherein the information obtaining means is accessible to the road map database and obtains the lane information, which indicates the configuration and the position of the traveling lane, from the road map database based on a sensed output of the position sensing means.

6. The vehicle drive assist system according to claim 1, further comprising a snow sensing means for sensing a snow state on the road surface, along which the vehicle travels, wherein when the snow sensing means senses presence of snow on the road surface, the display color adjusting means sets the display color of the at least one lane guide to a non-assimilatory color, which is substantially different from a color of a surface of the snow present on the road surface.

7. The vehicle drive assist system according to claim 1, further comprising an image capturing means for capturing an image of a view ahead the vehicle, wherein the information obtaining means extracts the lane information, which indicates the configuration and the position of the traveling lane, from the captured image that is captured by the image capturing means.

8. The vehicle drive assist system according to claim 7, wherein the image capturing means is a camera, which is capable of capturing a low light level image.

* * * * *